United States Patent
Braun et al.

(10) Patent No.: US 9,098,794 B2
(45) Date of Patent: Aug. 4, 2015

(54) DIRECT PRINTING OF OFFICE DOCUMENTS FROM THEIR NATIVE FILE FORMAT

(71) Applicant: CSR Imaging US, LP, Burlington, MA (US)

(72) Inventors: Michael Braun, Markgroeningen (DE); Marc Claus Kunz, Ludwigsburg (DE)

(73) Assignee: CSR Imaging US, LP, Burlington, MA (US)

( * ) Notice: Subject to any disclaimer, the term of this patent is extended or adjusted under 35 U.S.C. 154(b) by 0 days.

(21) Appl. No.: 14/145,714

(22) Filed: Dec. 31, 2013

(65) Prior Publication Data

US 2015/0186759 A1    Jul. 2, 2015

(51) Int. Cl.
*G06K 15/00* (2006.01)
*G06K 15/02* (2006.01)

(52) U.S. Cl.
CPC ............................ *G06K 15/1851* (2013.01)

(58) Field of Classification Search
CPC ....... G06F 3/122; G06F 3/124; G06F 3/1247; G06F 3/1285; G06F 3/1288; G06F 3/1215; G06F 3/1218; G06F 3/1206; G06F 3/1228; G06F 3/1244; G06F 3/1292; G06T 11/40; G06K 15/1836; G06K 15/1851; G06K 15/1857; H04N 1/0002; H04N 1/00015; H04N 1/00023; H04N 1/00034; H04N 1/00068
USPC ......................................... 358/1.15, 1.18, 1.9
See application file for complete search history.

(56) References Cited

U.S. PATENT DOCUMENTS

| | | | |
|---|---|---|---|
| 8,325,191 B2 * | 12/2012 | Kawabuchi et al. | 358/1.15 |
| 2005/0280837 A1 | 12/2005 | Ono et al. | |
| 2010/0110458 A1 * | 5/2010 | Sugiyama | 358/1.9 |
| 2010/0290094 A1 * | 11/2010 | Nagarajan | 358/474 |
| 2011/0292413 A1 * | 12/2011 | Crean | 358/1.9 |
| 2012/0105911 A1 * | 5/2012 | Belbin | 358/1.15 |
| 2012/0268777 A1 | 10/2012 | Fry | |
| 2013/0155456 A1 * | 6/2013 | Morrison et al. | 358/1.15 |
| 2013/0169980 A1 * | 7/2013 | Johnson et al. | 358/1.8 |

FOREIGN PATENT DOCUMENTS

| | | |
|---|---|---|
| EP | 1267254 A2 | 12/2002 |
| WO | 2013/089763 A1 | 6/2013 |

OTHER PUBLICATIONS

Search Report for Application No. GB1414535.3 mailed on Feb. 19, 2015, 3 pages.

* cited by examiner

*Primary Examiner* — Benny Q Tieu
*Assistant Examiner* — Juan M Guillermety
(74) *Attorney, Agent, or Firm* — John W. Branch; Lowe Graham Jones PLLC

(57) ABSTRACT

Embodiments are directed towards employing a printer to convert a document from its native file format into an image representation printable by the printer. A document may be provided to the printer in a native file format (e.g., .doc, .docx, .xls, .xlsx, .ppt, or .pptx) that is editable by a document-processing application. A page representation of each of page of the document to be printed may be determined. Each page representation (which may include a plurality of graphics primitives) may be determined straight from the native file format of the document independent of an intermediate page description language. From each page representation, an image representation (e.g., a bitmap) may be determined based on the plurality of graphics primitives of a corresponding page representation. At least one page of the document may be printed based on the determined image representations.

16 Claims, 9 Drawing Sheets

DIRECT PRINTING OF OFFICE DOCUMENTS FROM THEIR NATIVE FILE FORMAT

TECHNICAL FIELD

The present invention relates generally to printing documents, and more particularly, but not exclusively, to employing a printer to convert a document from a native file format of the document into a format suitable for printing.

BACKGROUND

Today, many computers utilize intermediate file formats to convert documents into a format that can be recognized by a printer. These intermediate file formats are sometimes in page description languages. Personal computers typically utilize a software module or print driver to convert a document into an intermediate format that is recognizable to the printer. So, each computer that wants to print a document generally has to install the appropriate print drivers to convert the document into the intermediate format, which can be problematic and time consuming. From this intermediate format, the printer can generally create the information needed to print the document. Often, however, the intermediate file that is sent to the printer is larger than the original document. So, increased bandwidth may be necessary and/or increased transmission times may be observed. Also, utilization of an intermediate page description language can lead to loss of fidelity in the finally printed image. Thus, it is with respect to these and other considerations that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
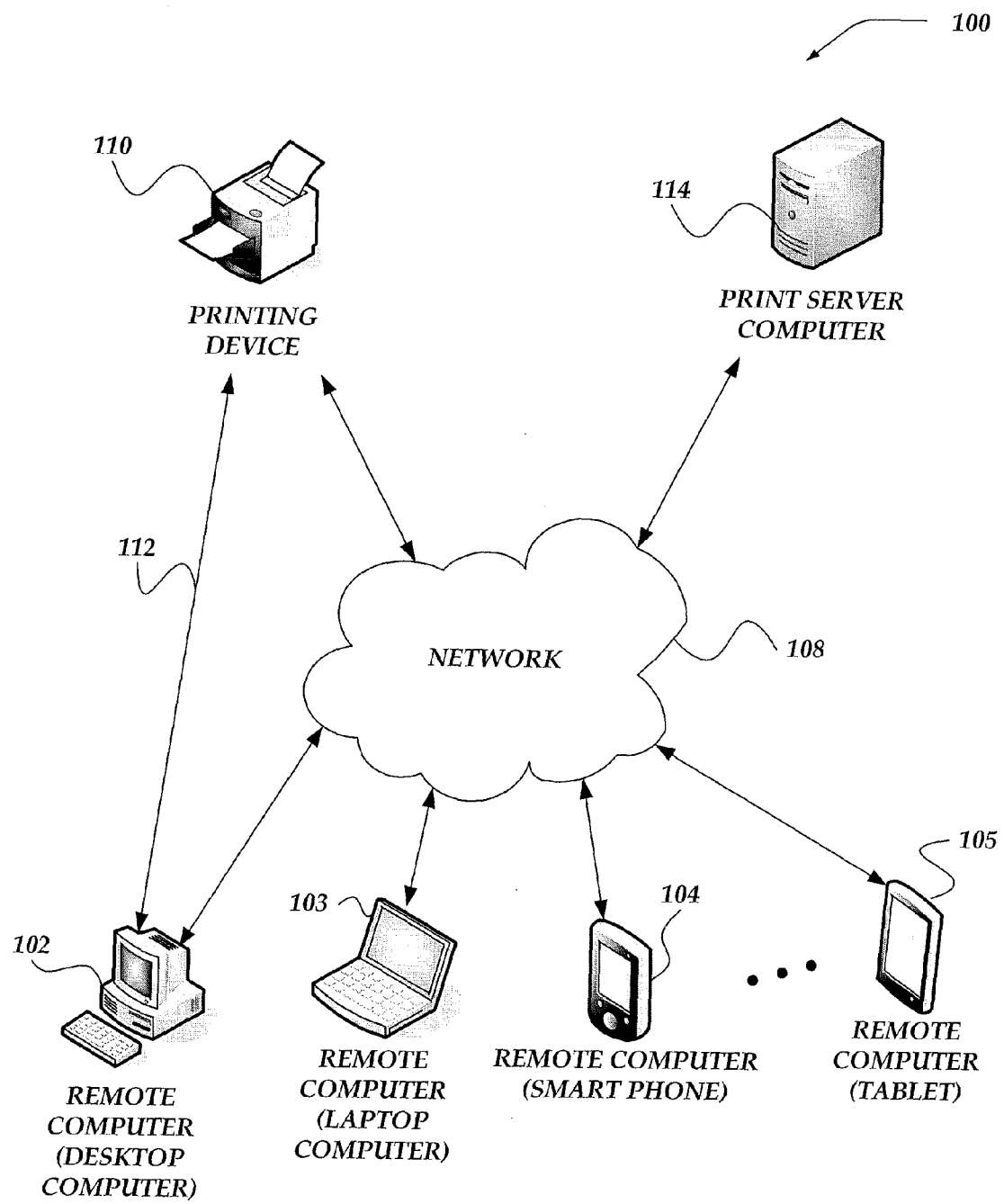
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "document" refers to a file that is in a format that is editable by a user employing a document-processing application. Examples of document formats may include, but is not limited to word processing formats (e.g., .doc, .docx), spreadsheet or workbook formats (e.g., .xls, .xlsx), presentation formats (e.g., .ppt, .pptx), or the like. In at least one of various embodiments, documents may be different, separate, and/or independent of files in non-user-editable formats, including page description languages, such as, for example, PostScript, PDF, printer command language (PCL), or the like. So, a file may refer to documents and files in a page description language. In some embodiments, documents may include to Microsoft Office documents. So, embodiments described herein may be utilized by a printer to convert straight from Microsoft Office documents to a page representation and image representation without first converting to an intermediate page description language. In various embodiments, a remote computer may not be employed to prepare a document for printing (e.g., convert the document into an intermediate page description language).

As used herein, the term "native file format" refers to a format of a file that is not converted, altered, or otherwise changed into a different format. Once a file is converted from one format to another, such as, for example, converting a .doc file into a PostScript file, then the document may no longer be in its native file format.

As used herein, the term "interpreter" or "interpreter engine" refers to a printer component operative to parse and layout at least one page of a file into a page representation. In some embodiments, an interpreter may convert one or more pages of a document (e.g., in a format such as .doc, .docx, .xls, .xlsx, .ppt, or .pptx) into corresponding page representations. The pages of a document to convert into page representations may be determined based on selection by a user. For example, a user may select to print an entire document, or the user may select to print one or more pages, or the like. In some embodiments, interpreters may also include components enabled to convert page description language files (e.g., PCL, PostScript, PDF, XPS, or the like) into page representations.

As used herein, the term "page representation" refers to a description of a page in basic geometric objects. In some embodiments, a separate page representation may be determined/generated for each separate page (e.g., at least one selected page) in a document. In various embodiments, a page representation may include a plurality of graphics primitives. In at least one of various embodiments, a page representation may be determined and processed in near real time as data is being provided to the printer. So, in some embodiments, a portion or subset of a page representation may be determined and provided to a graphics rendering engine for further processing before a next portion/subset of the page representation may be determined.

As used herein, the term "graphics primitives" refers to the simplest (i.e. 'atomic' or irreducible) geometric objects that the system (e.g., printer) can handle (e.g., draw, store, or the like). In various embodiments, graphics primitives may include: points, lines and/or line segments, planes, circles and/or ellipses, triangles and/or other polygons, spline curves, or the like. The combination of a plurality of graphics primitives for a particular page representation may accurately represent the original document's corresponding page's intended graphical/visual representation.

As used herein, the term "graphics rendering engine" refers to a printer component operative to render a page representation into an image representation suitable for reproduction by a print engine. In some embodiments, the graphics rendering engine may rasterize the graphics primitives of a page representation into a bitmap representation suitable to be imaged by the print engine. In some embodiments, the graphics rendering engine may scale or otherwise modify the resultant image representation based on printer constraints or capabilities (e.g., page size, printable area, memory utilization, or the like), user requests (e.g., zoom in or out), or the like, or a combination thereof. As noted above, a page representation may be determined and processed in near real time as data is being provided to the printer. So, in some embodiments, the graphics rendering engine may convert a portion or subset of the page representation into an image representation and provide the resulting portion of the image representation to the print engine for final printing.

As used herein, the term "image representation" refers to a description of a document page in its most basic printable elements, such as pixels. In various embodiments, the image representation may be a bitmap image of the corresponding document page. In some embodiments, pixels can be represented in various different formats, such as, for example, a compressed pixel format.

As used herein, the term "print engine" refers to a printer mechanism that translates an image representation into a printed image. In some embodiments, the print engine may include the physical printer engine that performs the printing of the image representation onto the paper (or other material/medium).

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to employing a printer to convert a document from its native file format into an image representation that can be printed by the print engine of the printer. A document may be provided to the printer in a native file format that is editable by a document-processing application. The native file format may be a word processing format (e.g., .doc or .docx), a spreadsheet format (e.g., .xls or .xlsx), or a presentation format (e.g., .ppt or .pptx), although other document formats may also be employed.

In some embodiments, the document may be provided to the printer from a remote computer (e.g., a personal computer or smart phone) or may be obtained straight from a portable storage medium connected to an input interface of the printer. In various embodiments, the document may be provided to the printer as a data stream, where the native file format of the document may be determined from the data stream.

A page representation of each of at least one page of the document may be determined. Each page representation may be determined straight from the native file format of the document independent of an intermediate page description language. So preprocessing or converting of the document at a remote computer into a page description language (or other intermediate format)—prior to providing the document to the printer—may not be performed. In various embodiments, an interpreter engine that corresponds to the native file format of the document may be employed, by the printer, to determine each page representation. So, different interpreter engines may be utilized for different document formats. In some embodiments, each page representation may include a plurality of graphics primitives that are supported by the printer. In some embodiments, separate subsets of the plurality of graphics primitives may be determined. Each separate subset of graphics primitives may correspond to separate bands of the page representation. This may allow the incoming document data stream to be processed in bands or slices, so that one band or slice of the page may be printed at a time, rather than buffering an entire page.

From each page representation (or each subset if printing may be performed in bands), an image representation may be determined based on the plurality of graphics primitives of a corresponding page representation. In some embodiments, the image representation may be determined by determining pixel accurate representations of each of the plurality of graphics primitives for each page representation and rasterizing the pixel accurate representations into a bitmap for each page representation. The at least one page of the document may then be printed based on the determined image representations.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include printing device 110, remote computers 102-105, printer server device 114, and network 108.

At least one embodiment of remote computers 102-105 is described in more detail below in conjunction with computer 200 of FIG. 2. Briefly, in some embodiments, remote computers 102-105 may be configured to communicate with printing device 110 and/or print server device 114. In various embodiments, remote computers 102-105 may provide a document in its native file format to printing device 110 and/or print server device 114.

In some embodiments, at least some of remote computers 102-105 may operate over a wired and/or wireless network to communicate with other computing devices or printing device 110. Generally, remote computers 102-105 may include computing devices capable of communicating over a network to send and/or receive information, perform various online and/or offline activities, or the like. It should be recognized that embodiments described herein are not constrained by the number or type of remote computers employed, and more or fewer remote computers—and/or types of remote computers—than what is illustrated in FIG. 1 may be employed.

Devices that may operate as remote computers 102-105 may include various computing devices that typically connect to a network or other computing device using a wired and/or wireless communications medium. Remote computers may include portable and/or non-portable computers. In some embodiments, remote computers may include client computers, server computers, or the like. Examples of remote computers 102-105 may include, but are not limited to, desktop computers (e.g., remote computer 102), personal computers, multiprocessor systems, microprocessor-based or programmable electronic devices, network PCs, laptop computers (e.g., remote computer 103), smart phones (e.g., remote computer 104), tablet computers (e.g., remote computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, remote computers 102-105 may include computers with a wide range of capabilities and features.

Remote computers 102-105 may access and/or employ various computing applications to enable users of remote computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, remote computers 102-105 may be enabled to connect to a network through a browser, or other web-based application.

Remote computers 102-105 may further be configured to provide information that identifies the remote computer. Such identifying information may include, but is not limited to, a type, capability, configuration, name, or the like, of the remote computer. In at least one embodiment, a remote computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of printing device 110 is described in more detail below in conjunction with printing device 400 of FIG. 4. Briefly, in some embodiments, printing device 110 may be a printer operative to print documents and other files. In some embodiments, printing device 110 may be configured to communicate with one or more of remote computers 102-105 to receive at least a portion of a document selected to be printed, as described herein. Examples of printing device 110 may include, but is not limited to, laser printers, LED printers (or other toner-based printing technologies), liquid inkjet printers, solid ink printers, dye-sublimation printers, inkless printers such as thermal printers and UV printers, dot-matrix printers, ink-based plotters, or the like.

Remote computers 102-105 may communicate with printing device 110 via wired technology 112 and/or network 108. In various embodiments, wired technology 112 may include a USB cable, printer cable, or the like for connecting to remote computers 102-105.

Network 108 may include virtually any wired and/or wireless technology for communicating with a remote device, such as, but not limited to Bluetooth, Wi-Fi, or the like. In some embodiments, network 108 may be a network configured to couple network computers with other computing devices, including remote computers 102-105, printing device 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least remote computers 103-105. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between remote computers 102-105, printing device 110, print server device 114, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Print server device 114 may be a network computer capable of forwarding documents to printing device 110. In some embodiments, a remote computer (e.g., remote computer 102-105) may send and/or otherwise transfer a document (or other file) to print server device 114, such as via network 108. Print server device 114 may be enabled to forward and/or otherwise transfer the document to printing device 110, such as via network 108 or a physical connection (not illustrated).

Computers that may be arranged to operate as print server device 114 include various network computers, including, but not limited to personal computers, desktop computers, multiprocessor systems, microprocessor-based or programmable consumer electronics, network PCs, server computers/devices, network appliances, or the like.

Although FIG. 1 illustrates print server device 114 as a single computing device, embodiments are not so limited. Rather, one or more functions of print server device 114 may be distributed across one or more distinct network computers. Moreover, print server device 114 is not limited to a particular configuration. For example, in one embodiment, print server device 114 may contain a plurality of network computers. In another embodiment, print server device 114 may contain a plurality of network computers that operate using a principal/agent (or primary/secondary) approach, where one of the plurality of network computers operates to manage and/or otherwise coordinate operations of the other network computers. In other embodiments, print server device 114 may operate as a plurality of network computers arranged using one or more architectures, including cluster architectures, peer-to-peer architectures, cloud-based architectures, or the like. Thus, embodiments may be implemented in a variety of architectures and/or configurations, and are not limited to a single environment. It should also be recognized that, although FIG. 1 illustrates a single print server device, embodiments are not so limited, but rather, in some embodiments, a plurality y of different print server devices may be employed.

Illustrative Computer

Figure 2:
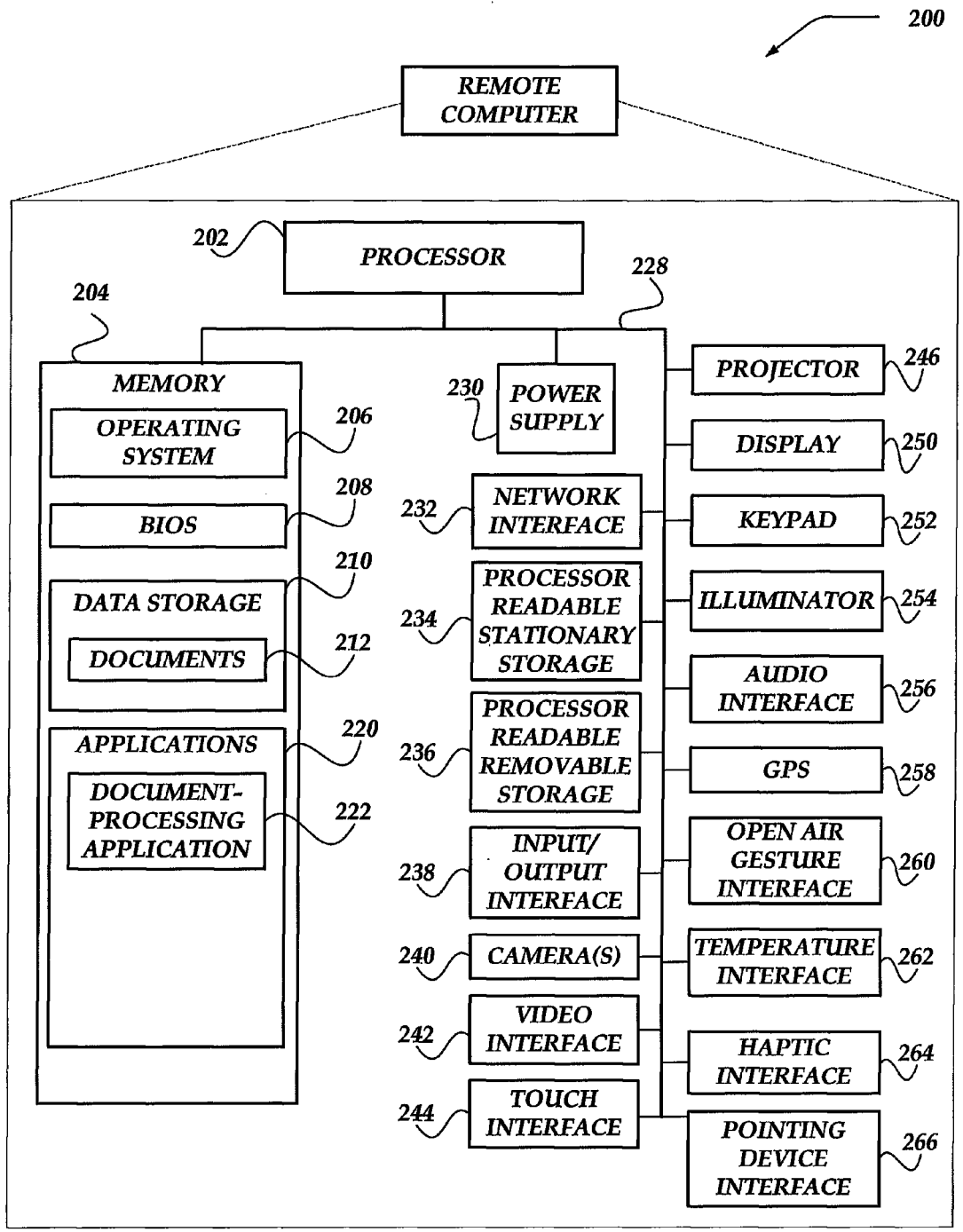
FIG. 2 shows an embodiment of a remote computer that may be included in a system such as that shown in FIG. 1.

FIG. 2 shows one embodiment of remote computer 200 that may include many more or less components than those shown. Remote computer 200 may represent, for example, at least one embodiment of remote computers 102-105 shown in FIG. 1.

Remote computer 200 may include processor 202 in communication with memory 204 via bus 228. Remote computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Remote computer 200 may optionally communicate with a base station (not shown), or directly with another computer. And in one embodiment, although not shown, a gyroscope may be employed within remote computer 200 to measuring and/or maintaining an orientation of remote computer 200.

Power supply 230 may provide power to remote computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling remote computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of remote computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile computer is powered. Also, illuminator 254 may backlight these buttons in various patterns when particular actions are performed, such as dialing another mobile computer. Illuminator 254 may also cause light sources positioned within a transparent or translucent case of the mobile computer to illuminate in response to actions.

Remote computer 200 may also comprise input/output interface 238 for communicating with external peripheral devices or other computers such as other mobile computers and network computers. Input/output interface 238 may enable remote computer 200 to communicate with one or more printers, such as printing device 110 of FIG. 1. Other peripheral devices that remote computer 200 may communicate with may include remote speakers and/or microphones, headphones, display screen glasses, or the like. Input/output interface 238 can utilize one or more technologies, such as Universal Serial Bus (USB), Infrared, WiFi, WiMax, Bluetooth™, wired technologies, or the like.

Haptic interface 264 may be arranged to provide tactile feedback to a user of a mobile computer. For example, the haptic interface 264 may be employed to vibrate remote computer 200 in a particular way when another user of a computer is calling. Temperature interface 262 may be used to provide a temperature measurement input and/or a temperature changing output to a user of remote computer 200. Open air gesture interface 260 may sense physical gestures of a user of remote computer 200, for example, by using single or stereo video cameras, radar, a gyroscopic sensor inside a computer held or worn by the user, or the like. Camera 240 may be used to track physical eye movements of a user of remote computer 200.

GPS transceiver 258 can determine the physical coordinates of remote computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of remote computer 200 on the surface of the Earth. It is understood that under different conditions, GPS transceiver 258 can determine a physical location for remote computer 200. In at least one embodiment, however, remote computer 200 may, through other components, provide other information that may be employed to determine a physical location of the mobile computer, including for example, a Media Access Control (MAC) address, IP address, and the like.

Human interface components can be peripheral devices that are physically separate from remote computer 200, allowing for remote input and/or output to remote computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A remote computer may include a browser application that is configured to receive and to send web pages, web-based messages, graphics, text, multimedia, and the like. The remote computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of remote computer 200. The memory may also store operating system 206 for controlling the operation of remote computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by remote computer 200 to store, among other things, applications 220 and/or other data. For example, data storage 210 may also be employed to store information that describes various capabilities of remote computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of remote computer 200, including, but not limited to, non-transitory processor-readable removable storage device 236, processor-readable stationary storage device 234, or even external to the mobile computer.

Data storage 210 may store documents 212 or other data files. Documents 212 may include one or more documents that may be editable by a user by employing document-processing application 222. In some embodiments, document-processing application 222 or another application (e.g., a web browser) may be utilized to forward, send, and/or otherwise transfer a document (or other file) to another computing device, such as print server device 114 of FIG. 1. In at least one such embodiment, the document may be transferred to the other computing device in its native file format (i.e., without first converting the documenting into another file format, such as an intermediate page description language).

Applications 220 may include computer executable instructions which, when executed by remote computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Computer

Figure 3:
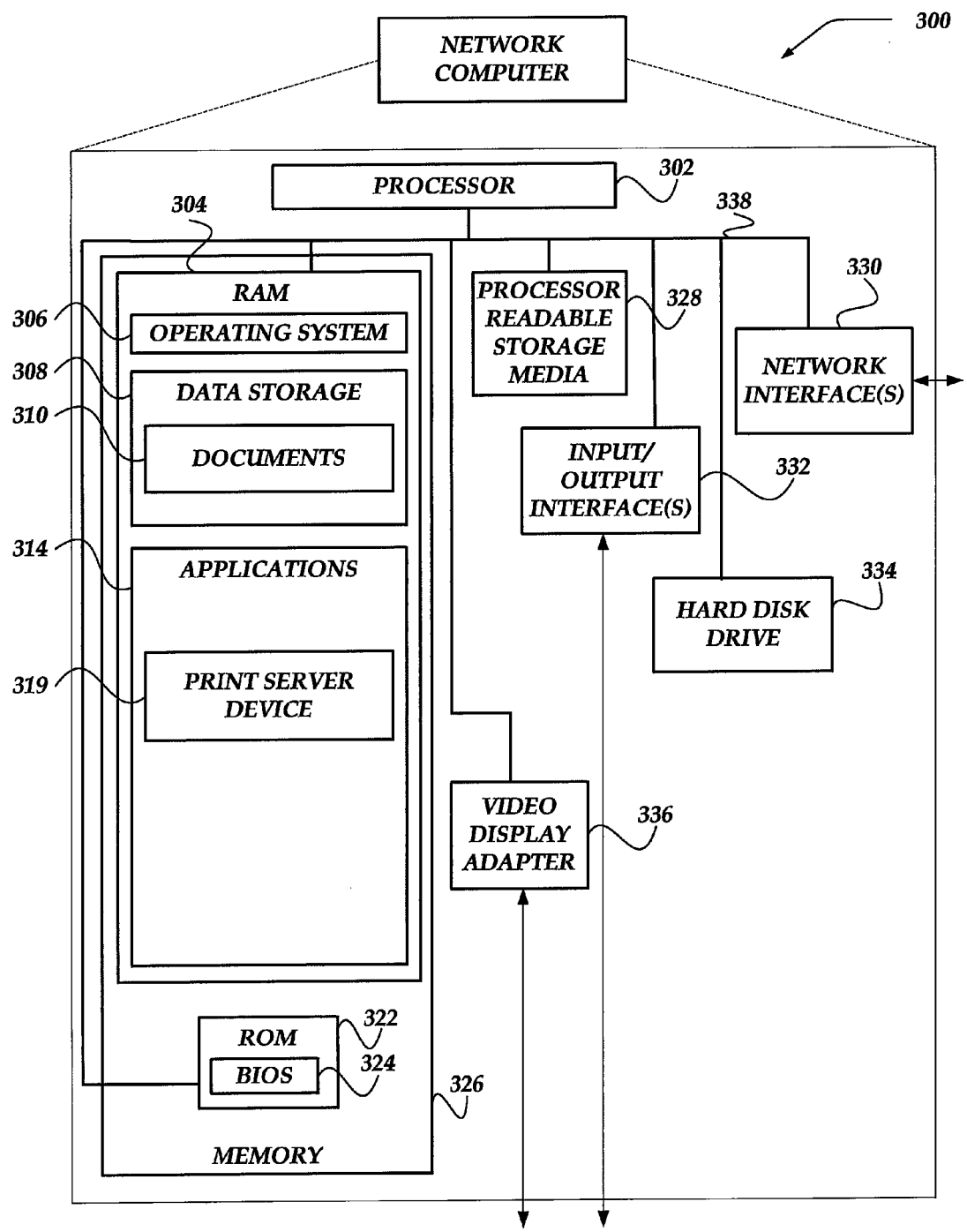
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other device. Network computer 300 may represent, for example print server computer 114 of FIG. 1, and/or other network devices.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, printer (e.g., printing device 110 of FIG. 1) or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another device based on any of a variety of events, including being sent as part of a header during a communication, sent upon request, or the like. Data storage 308 may also be employed to store documents 310. Documents 310 may include one or more documents that may be printed.

Data storage 308 may also include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include print server device 319.

Print server device 319 may be configured to receive a document from a remote computer, such as remote computers 102-105 of FIG. 1. In some embodiments, printer server device 319 may be employed by print server device 114 of FIG. 1. In any event, print server device 319 may be employed to forward documents to a printer, such as printing device 110 of FIG. 1, via a physical connection (e.g., a USB cable) or a network connection (e.g., through network 108 of FIG. 1) without converting the document to an intermediate page description language.

Illustrative Imaging Device

Figure 4:
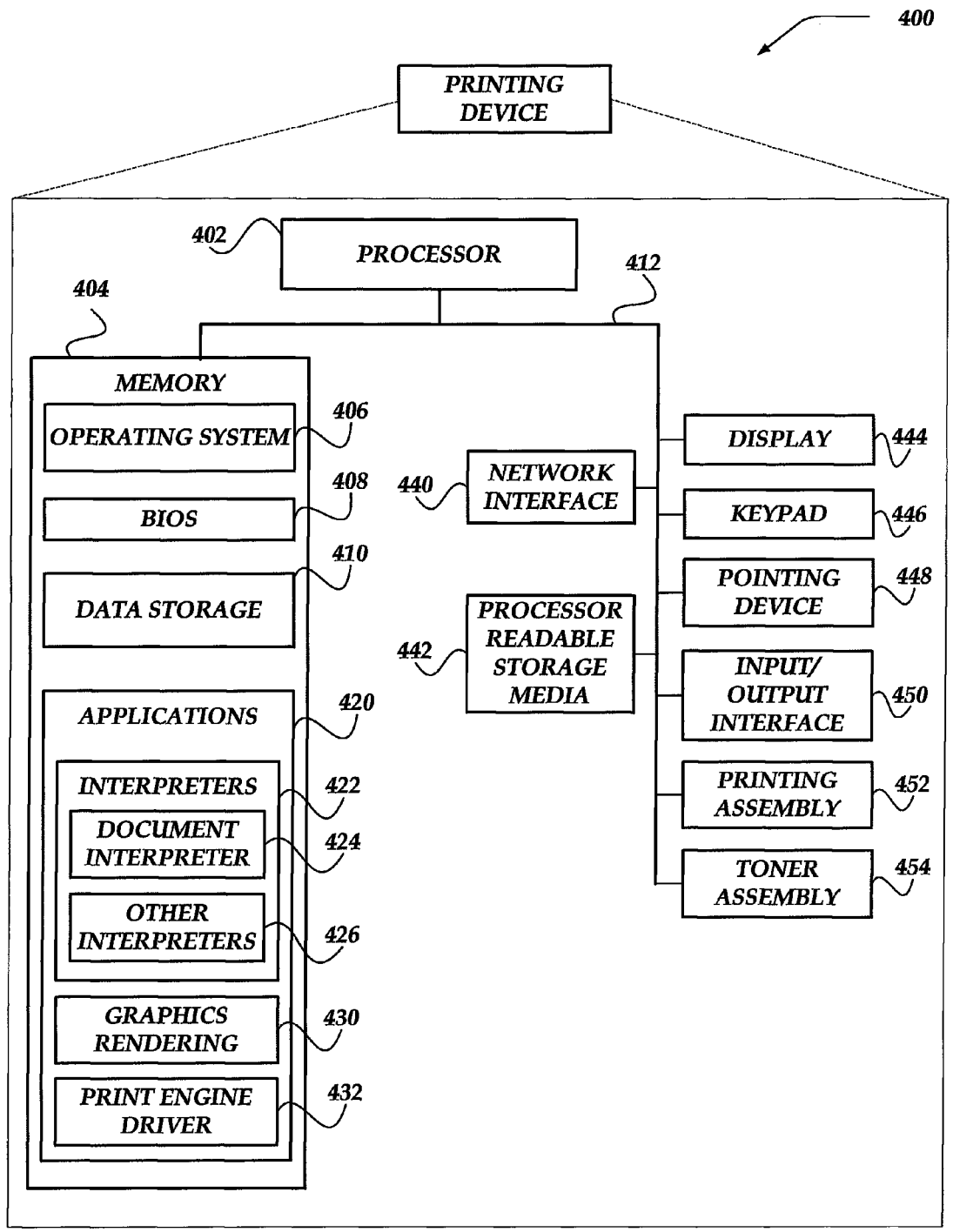
FIG. 4 shows an embodiment of a printing device that may be included in a system such as that shown in FIG. 1.

FIG. 4 shows one embodiment of printing device 400 that may be included in a system implementing the invention. Printing device 400 may include many more or less components than those shown in FIG. 4. However, the components shown are sufficient to disclose an illustrative embodiment for practicing the present invention. Printing device 400 may represent, for example, printing device 110 of FIG. 1. In various embodiments, printing device 400 may be employed to perform various embodiments described herein, including processes or parts of processes 600 and 700 of FIGS. 6 and 7, respectively.

In some embodiments, printing device 400 may be configured to print an image utilizing various printing technologies, including, but not limited to laser printers, LED printers (or other toner-based printing technologies), liquid inkjet printers, solid ink printers, dye-sublimation printers, inkless printers such as thermal printers and UV printers, dot-matrix printers, ink-based plotters, or the like. In some embodiments, printing device 400 may represent a multi-function printer (MFP).

As shown, printing device 400 may include processor 402, one or more network interfaces 440, processor readable storage media 442, display 444, keyboard and/or keypad 446, pointing device 448, input/output interface 450, printing assembly 452, toner assembly 454, and memory 404, all in communication with each other via bus 412.

Printing device 400 may communicate with a remote computer, such as remote computer 200 of FIG. 2 or network computer 300 of FIG. 3, the Internet, or some other communications network, via network interface(s) 440. Network interface 440 may enable various communication protocols including but not limited to TCP/IP, Wi-Fi, Bluetooth, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 440 is sometimes known as a transceiver, transceiving device, or network interface card (NIC).

Display 444 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 444 may also interface with keyboard/keypad 446 and/or pointing device 448 to receive and/or display user input. Additionally, or alternatively, printing device 400 may communicate with one or more display devices that are external to the printer, to display information regarding print jobs.

Keyboard/keypad 446 may comprise any input device arranged to receive input from a user. For example, keyboard/keypad 446 may include a push button numeric dial, keyboard, touch screen, or the like. Keyboard/keypad 446 may include alphabetic inputs, numeric inputs, and/or other character inputs, and may further include function and/or command buttons associated with functionality for selecting, examining, editing, and/or printing documents. User inputs made via keyboard/keypad 446 may be shown in display 444.

Pointing device 448 may include virtually any device that enables a user to input spatial and/or positional data to printing device 400. Pointing device 448 may include devices based on the user touching a surface, such as a touchpad, touchscreen, graphics tablet, joystick or pointing stick, either with a body part (e.g. finger or hand) or with an object such as a wand, stylus, pen, lightpen and the like. Pointing device 448 may further include devices based on the user moving an object, such as a mouse, trackball, joystick, and the like. User inputs made via pointing device 448 may be shown in display 444.

Input/output interface 450 may include various means for communicating with external devices, such as external displays, user input devices, computer devices, networking devices, and the like. Input/output interface 450 may employ one or more communications technologies including but not limited to USB, Bluetooth, serial port (e.g. RS-232 standard), parallel port (e.g. IEEE 1284 standard), and the like. In some embodiments, a USB driver or other portable storage device may communicated with printing device 400 through input/output interface 450 and be utilized to provide a document to printing device 400.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of printing device 400. The memory may also store operating system 406 for controlling the operation of printing device 400. It will be appreciated that this component may include a general-purpose operating system such as a version of UNIX, or LINUX™, or a specialized operating system designed and created to support the functionality of printing device 400. The operating system may include or interface with a virtual machine module such as the Java virtual machine or Microsoft .NET runtime that may enable control of hardware components and/or operating system functions via applications that run under such virtual machine modules.

Although illustrated separately, memory 404 may include processor readable storage media 442. Processor readable storage media 442 may be referred to and/or include computer readable media, computer readable storage media, and/or processor readable storage device. Processor readable storage media 442 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by printing device 400 to store, among other things, applications 420 and/or other data. For example, data storage 410 may also be employed to store information that describes various capabilities of printing device 400. The information may then be provided to another device based on any of a variety of events, including being sent as part of a header during a communication, sent upon request, or the like.

Data storage 410 may also store program code, instructions, and/or data. For example data storage 410 may be configured to store imaging commands, diagnostics, user preferences, imaging control software, information regarding the capabilities of the printing device such as supported color palettes, fonts, pagination, page size, and the like. Data storage 410 may further store documents to be printed (e.g., queuing multiple print jobs), intermediate files (e.g., page representations and/or image representations), or the like, as well as any other information needed for selecting, examining, editing, modifying, displaying, and/or printing a document or file.

Applications 420 may include computer executable instructions, which may be loaded into mass memory and run on operating system 406. Applications 420 may include interpreters 422, graphics rendering engine 430, and print engine driver 432. Interpreters 422 may include document interpreter engine 424 and other interpreter engines 426. Document interpreter engine 424 may be configured to determine page representations of each requested page of a document to be printed. In various embodiments, document interpreter engine 424 may convert one or more pages from documents in formats, such as .doc, .docx, .xls, .xlsx, .ppt, or .pptx, into separate page representations that each includes a plurality of graphics primitives. Other interpreter engines 426 may include engines configured to convert files in a page description language into page representations. Graphics rendering engine 430 may be configured to determine image representations of each page representation. And print engine may be configured to communicate with other printing hardware and/or software (e.g., printing assembly 452) to facilitate printing of the determined image representations/

As stated herein, printing device 400 may incorporate various types of printing technologies without departing from the scope of the invention. In some embodiments, printing device 400 may be configured to employ laser printing technology. The following is an example, non-limiting description of laser printing technology that may be employed to implement embodiments of the invention. In such embodiments, printing assembly 452 may include such elements as are necessary for laser printing, such as a drum assembly, corona wire, fuser, discharge lamp, laser scanning unit, and/or photoreceptor. In some embodiments, drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 454 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the invention are not limited to this method of transferring data onto a print material, and other mechanisms may also be used. Thus, the invention is not to be constrained or otherwise narrowed by this embodiment.

In various embodiments, printing assembly 452 and/or toner assembly 454 may communicate with print engine driver 432 to facilitate printing of documents and other files and/or images. Print engine driver 432 may be responsible for numerous actions associated with the physical printing of the document, including, but not limited to, setting up the print engine to print a page, requesting paper to be fed through the printer, passing the application generated raster data (e.g., image representation) to the print engine, monitoring for completion of the print job, monitoring for errors, or the like. Print engine driver 432 may select a paper size, media type, input tray, output bin, other finishing options or print engine parameters, or the like. In various embodiments, print engine driver 432 and/or the physical print engine may be capable of handling one or more pages in parallel.

Example System Diagram

Figure 5:
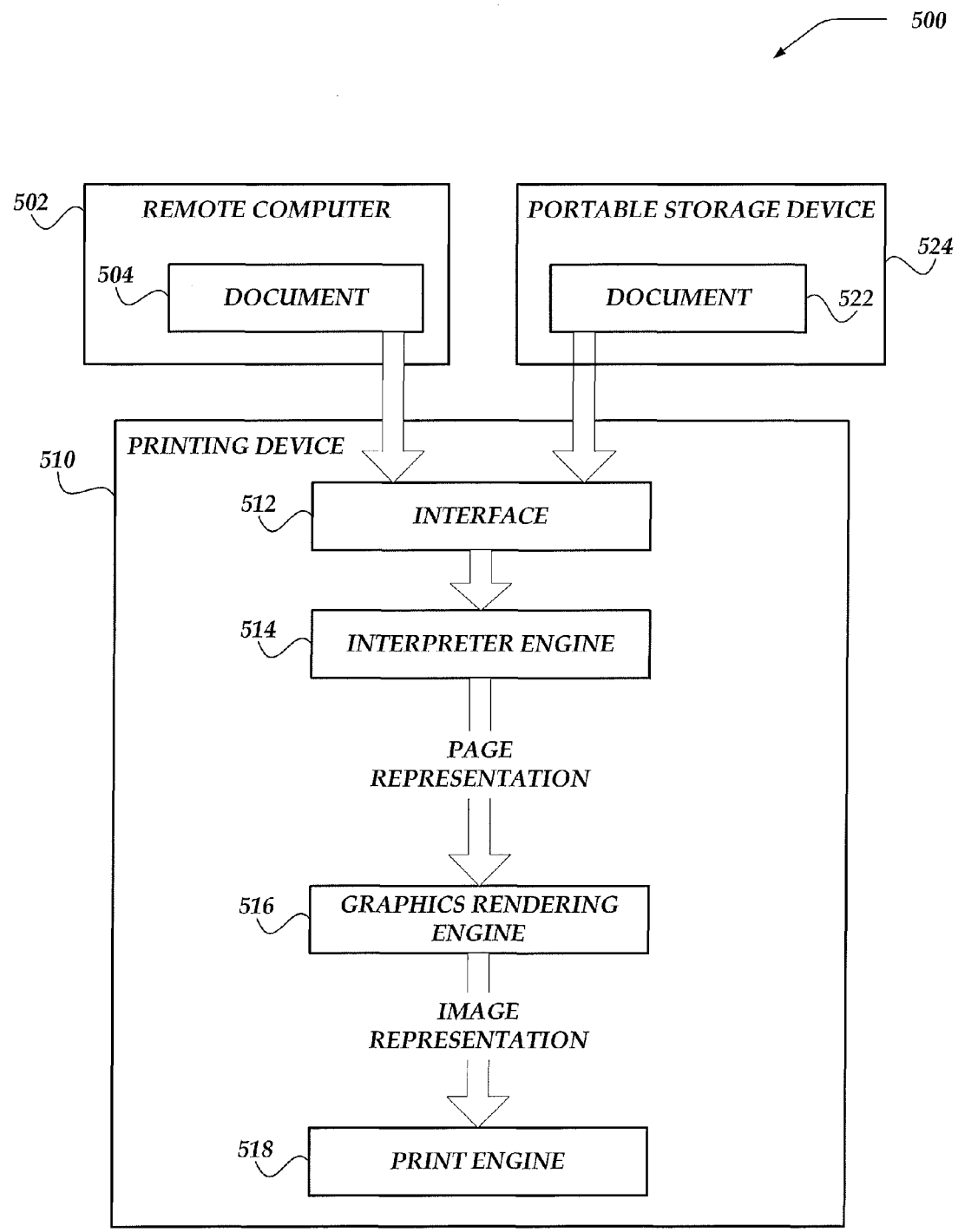
FIG. 5 illustrates a block diagram of a system that may be employed to print a document.

FIG. 5 illustrates a block diagram of a system that may be employed to print a document. System 500 may include remote computer 502 and printing device 510. Remote computer 502 may be an embodiment of remote computer 200 of FIG. 2 (or network computer 300 of FIG. 3). And printing device 510 may be an embodiment of printing device 400 of FIG. 4.

In some embodiments, remote computer 502 may provide document 504 to printing device 510. Document 504 may be in its native file format and not altered or otherwise converted (e.g., by a print driver operating on remote computer 502) into a different format (e.g., into a page description language). In other embodiments, a document may be provided to printing device 510 by portable storage device 524 (e.g., document 522). Portable storage device 524 may be a USB drive, DVD, or other storage media. In various embodiments, document 522 may be an embodiment of document 504.

In various embodiments, printing device 510 may receive document 504 at an interface, such as interface 512. Interface 512 may provide document 504 to interpreter engine 514. In some embodiments, interface 512 or another component (not illustrated) may determine which of a plurality of interpreter engines to utilize to process the document. So, interpreter engine 514 may include one or more different interpreter engines that can each support a different file format and convert the received data into one or more page representations. For example, interpreter engine 514 may include a document interpreter engine (e.g., document interpreter engine 424 of FIG. 4) for converting documents (e.g., .doc, .docx, .xls, .xlsx, .ppt, or .pptx documents) into page representations. In other embodiments, interpreter engine 514 may include other interpreters (e.g., other interpreters 426 of FIG. 4) for converting files in various page description languages or other non-document formats into page representations. As described herein, interpreter engine 514 may be operative to convert documents from their native file format into graphics primitives (supported by printing device 510) without first converting the document into an intermediate format, such as a page description language. In some embodiments, interpreter engine 514 may be implemented as hardware, software, or a combination thereof.

Interpreter engine 514 may provide the determined/generated page representations to graphics rendering engine 516. Graphics rendering engine 516 may convert the page representations into image representations. In various embodiments, graphics rendering engine 516 may be an embodiment of graphics rendering engine 430 of FIG. 4. In some embodiments, rendering engine 516 may be implemented as hardware, software, or a combination thereof.

Graphics rendering engine 516 may provide the determined/generated image representations to print engine 518 for printing. In some embodiments, interface 512, interpreter engine 514, graphics rendering engine 516, and/or print engine 518, or some combination thereof may be employed as an embedded system within printing device 510. So, in some embodiments, the various engines may be tightly integrated to optimize memory usage and strategies to recover/reduce already allocated memory when additional memory is require but not available.

General Operation

The operation of certain aspects of the invention will now be described with respect to FIGS. 6 and 7. In at least one of various embodiments, processes 600 and 700 described in conjunction with FIGS. 6 and 7, respectively, may be implemented by and/or executed on a printing device, such as printing device 400 of FIG. 4. Additionally, various embodiments described herein can be implemented in a system such as system 100 of FIG. 1.

Figure 6:
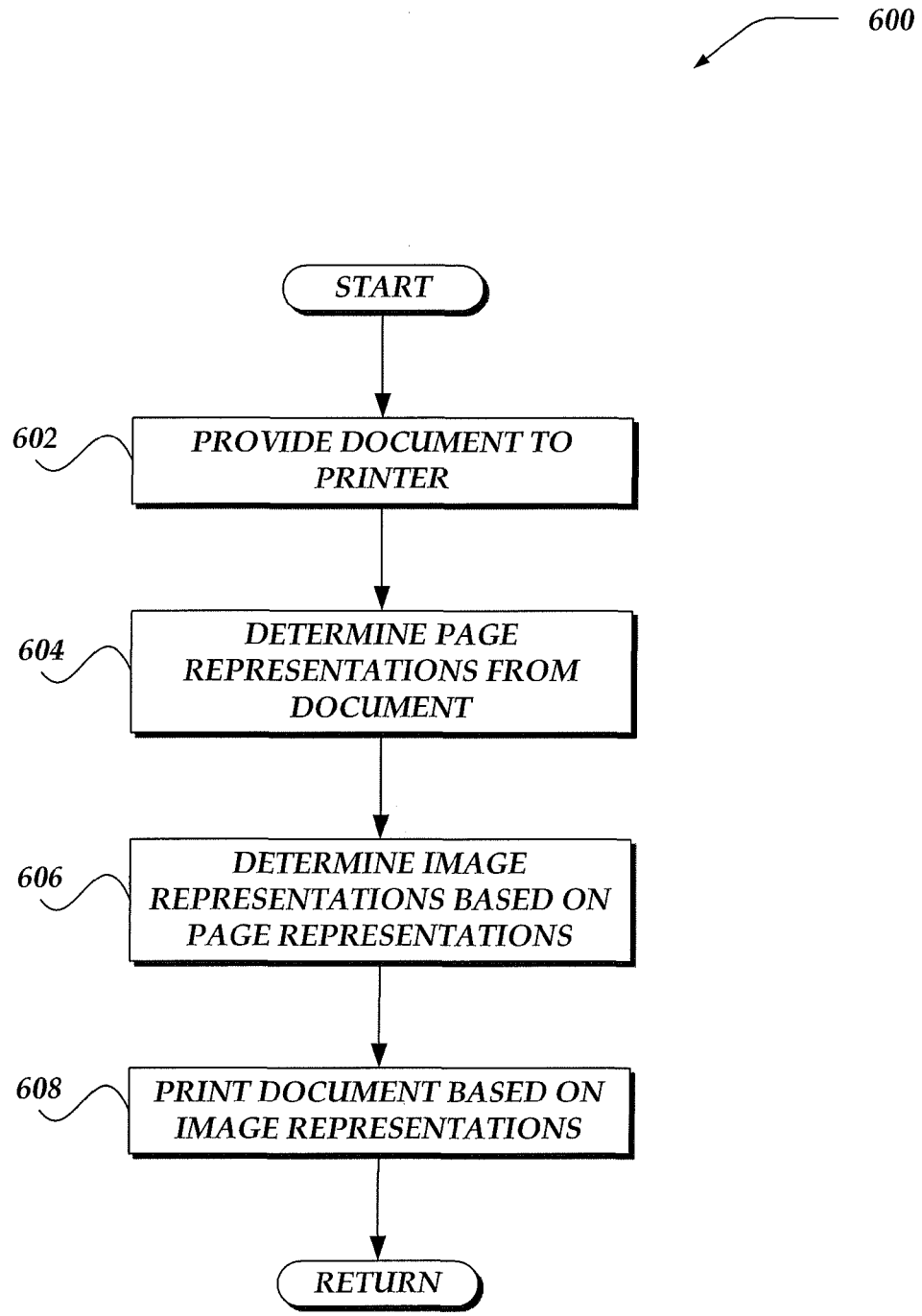
FIG. 6 illustrates a logical flow diagram generally showing one embodiment of an overview process for employing a printer to print a document from its native file format.

FIG. 6 illustrates a logical flow diagram generally showing one embodiment of an overview process for employing a printer to print a document from its native file format. Process 600 may begin, after a start block, at block 602, where a document (or at least a portion of the document) may be provided to a printer. In various embodiments, the printer may be an embodiment of printing device 400 of FIG. 4. In some embodiments, a remote computer (e.g., remote computer 200 of FIG. 2 or network computer 300 of FIG. 3) may provide the document to the printer. In at least one of such embodiments, a user may employ a print command from a document-processing application. In another embodiment, the user may drag-and-drop an icon of the document into a printer icon. In yet another embodiment, the user may upload the document to a website, email the document, or otherwise transfer the document to a printer server device that may forward the document to the printer. The remote computer may then transmit the document to the printer. In other embodiments, a USB drive or other portable storage media may be connected to the printer, such that the printer may read and/or otherwise obtain the document directly from the portable storage media.

In various embodiments, the document may be in a native file format that can be edited by a document-processing application. In at least one of various embodiments, the printer may be provided the raw document data, which, in some embodiments, may be in a data stream to permit processing as data is being transferred to the device (rather than buffering an entire page and/or document before processing). In contrast to other printing systems that utilize a print driver (or other module) executing on the remote computer to convert the document into a page description language prior to providing it to the printer, embodiments described herein may not employ printer drivers on the remote computer. Rather, the original document in its native file format may be provided to the printer.

In some embodiments, the file may be compressed by the remote computer prior to sending to the printer. In at least one of various embodiments, this compression may employ at least one of numerous lossless compression techniques. The printer may decompress at least a portion of the document that corresponds to at least one page of the document prior to determining each page representation.

Process 600 may proceed to block 604, where a page representation of at least one page of the document may be determined. In various embodiments, a separate page representation may be generated for each separate page in the document to be printed. In some embodiments, a print request may identify those pages in the document that a user selected to print (e.g., all pages, a single page, multiple pages, or the like). In at least one such embodiment, options may be passed along with the print request that, among other things, identify which pages to print.

The page representations may be determined directly from the document independent of a page description language. So, in the various embodiments, the page representations may be generated based on the native file format of the document without the need to first convert the document into a page description language (e.g., printer command language, post script, XML paper specification, or the like) or other intermediate format. In various embodiments, a remote computer may not be necessary to convert the document into a generalized printing format (also referred to a page description language or page description data stream).

In various embodiments, each page representation may include a plurality of graphics primitives that are supported by the printer. In some embodiments, the plurality of graphics primitives may be customized for the particular printer being utilized. So, each different printer model may support different types/definitions/configurations of graphics primitives. Printer support of graphics primitives may include recognizing, interpreting, utilizing, or otherwise understanding graphics primitives to be able to generate image representations based on the graphics primitives. In some embodiments, the graphics primitives may be manipulatable, while minimizing/reducing loss of data in converting the document into image representations. For example, the printer may be enabled to scale an image representation of a page representation based on constraints of the printer (e.g., memory, printable area/page size, or the like).

In some embodiments, separate subsets of the plurality of graphics primitives may be determined as a data stream (of the document) is provided to the printer. In at least one of various embodiments, each separate subset may correspond to separate bands of the at least one page. Each band may be a portion of the document page to be printed, such that one portion of the page may be printed at a time. By processing and printing a page in bands, the total amount of available memory may be reduced because the system is not buffering an entire page (i.e., the printer may buffer each portion of a page serially).

In some embodiments, determining the page representation may include determining line breaks and/or page breaks within the document. The line and/or page breaks may be employed to indicate and/or identify pages, and may be utilized to determine the content of document pages to be printed. The content of these document pages may then be converted into a plurality of graphics primitives for a corresponding page representation.

Process 600 may continue at block 606, where an image representation of each page representation may be generated based on the plurality of graphics primitives of a corresponding page representation. In various embodiments, the image representation may be a bitmap representation of the page to be printed. In some embodiments, pixel accurate representations of each of the plurality of graphics primitives may be determined for each page representation. The pixel accurate representations may be rasterized into a bitmap for each page representation. In some embodiments, rasterization may be employed on the page representation to generate the image representation. In at least one of various embodiments, the image representation may be in a format recognizable by a printer engine.

As described herein, portions of a page (e.g., less than an entire page) may be separately processed. In some such embodiments, a portion of a full page image representation may be determined from the separate subsets of graphics primitives for the portions of page representations. These portions of the image representation may be rendered for printing so the page may be printed in bands/slices.

Process 600 may proceed next to block 608, where at least one page of the document may be printed based on the image representation. In some embodiment, the image representation may be provided to a print engine for execution of the physical printing of the document.

After block 608, process 600 may terminate and/or return to a calling process to perform other actions.

Figure 7:
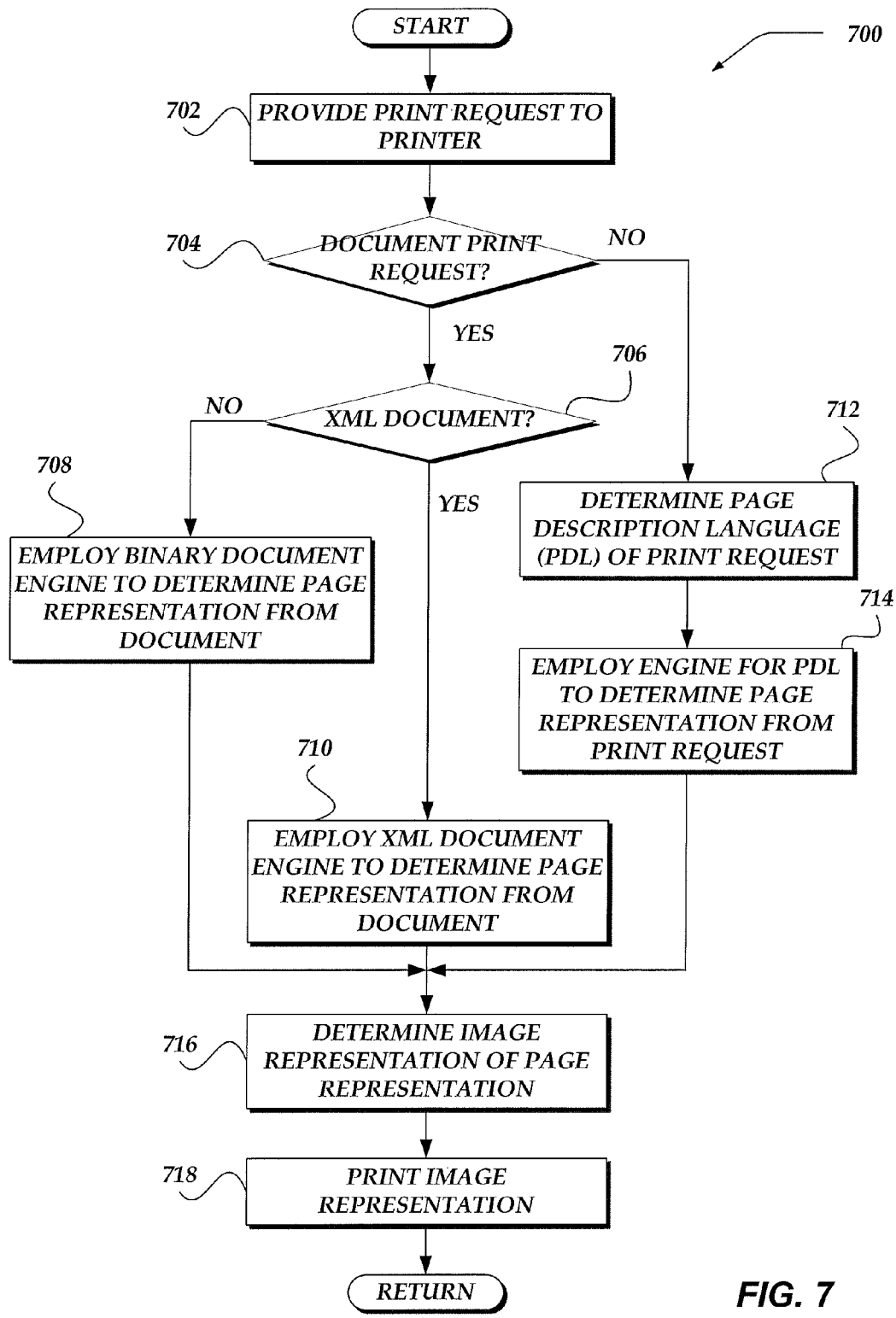
FIG. 7 illustrates a logical flow diagram generally showing one embodiment of a process for employing a printer to print a file.

FIG. 7 illustrates a logical flow diagram generally showing one embodiment of a process for employing a printer to print a file. Process 700 may begin, after a start block, at block 702, where a print request may be provided to a printer. In various embodiments, the print request may be to a file in one of numerous formats supported by the printer. In at least one of various embodiments, the print request may be to print a document (e.g., in a format, such as .doc, .xls, .ppt, .docx, .xlsx, .pptx, or the like), a file in a page description language (e.g., printer command language, PostScript, PDF, XML paper specification, or the like), other printable files, or the like.

In some embodiments, the print request may be provided by a remote computer and received at the printer. In other embodiments, the request may be automatically provided based on a detection of a USB drive or other portable storage device (e.g., if the USB drive is connected to an input interface of the printer). In at least one such embodiment, a user may be enabled to utilize a user interface on the printer to select a file from the removable storage device to print and which pages to print.

In some embodiments, the print request may identify the print job, include the file, include one or more options and/or settings associated with the print job, or the like. In various embodiments, the options/settings may identify which pages (or portions of pages) to be printed, a number of copies, color or black/white selection, print quality, or the like. In some embodiments, the print request may not include one or more options/settings needed to print the document, in which case, default options/settings stored on the printer may be utilized.

Process 700 may proceed to decision block 704, where a determination may be made whether the print request is for a document. In at least one of various embodiments, the printer may determine a format of the file associated with the print request. The file may be affirmatively determined to be a document if the print request is associated with a file that has native file format of a document (e.g., .doc, .xls, .ppt, .docx, .xlsx, or .pptx).

In some embodiments, this determination may be made based on a file extension of the file associated with the print request. In other embodiments, this determination may be based on an analysis of at least a portion of the file and/or print request. For example, the print request may include a data steam of at least a portion of the file, and the printer may analyze the data stream to determine if the incoming data is in a document format. In some embodiments, the incoming data stream may include header data, metadata, or other information that can be utilized to identify the type/format of print request (e.g., if the incoming data stream matches a know sequence of data in a particular document format). If the print request is for a document, then process 700 may flow to decision block 706; otherwise, process 700 may flow to block 712.

At decision block 706, a determination may be made whether the document is in XML format or binary format. Similar to determining if the print request is for a document, header data, metadata, or other information can be utilized to determine if the document is an XML document or a binary document (e.g., if the incoming data matches a know sequence of data in XML format). If the document is in XML format, then process 700 may flow to block 710; otherwise, process 700 may flow to block 708.

At block 710, an XML document conversion engine may be employed to determine one or more page representations of the XML document. In various embodiments, a plurality of graphics primitives may be determined for each page representation based on the XML document. After block 710, process 700 may flow to block 716.

If, at decision block 706, it is determined that the document is not in XML format, then process 700 may flow from decision block 706 to block 708. At block 708, a binary document engine may be employed to determine at least one page representation of the document. In various embodiments, a plurality of graphics primitives may be determined for each page representation based on the binary document. After block 708, process 700 may flow to block 716.

If, at decision block 704, the print request is not for a document, then process 700 may flow from decision block 704 to block 712. At block 712, a page description language (PDL) corresponding to the print request may be determined. In various embodiments, header data, metadata, or other information can be utilized to determine if the document is an XML document or a binary document (e.g., if the incoming data matches a know sequence of data in a particular page description language).

Process 700 may proceed to block 714, where a PDL engine that corresponds to the PDL of the file may be employed to determine one or more page representations from the print request. In various embodiments, a plurality of graphics primitives may be determined for each page representation based on the PDL.

After blocks 708, 710, and 714, process 700 may flow to block 716. At block 716, an image representation of each page representation may be determined. In at least one of various embodiments, block 716 may employ embodiments of block 606 of FIG. 6 to convert the page representations into image representations (e.g., bitmap images of each page to be printed).

Process 700 may proceed next to block 718, where the image representations may be printed. In at least one of various embodiments, block 718 may employ embodiments of block 608 to print at least one page associated with the print request.

After block 718, process 700 may terminate and/or return to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example System Architecture

Figure 8A:
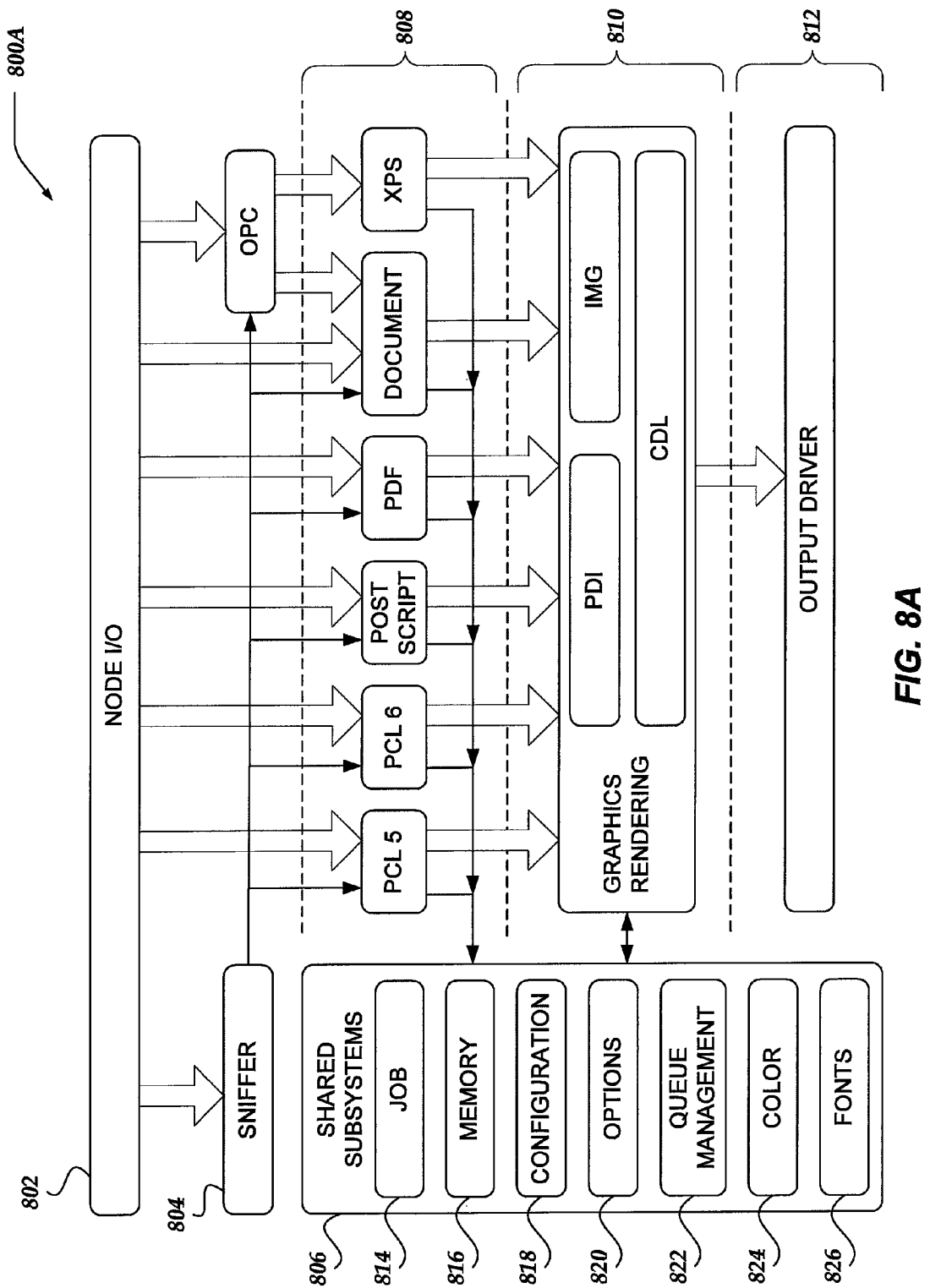
FIGS. 8A and 8B illustrate use case block diagram examples of a system that may be employed to print a document.
Figure 8B:
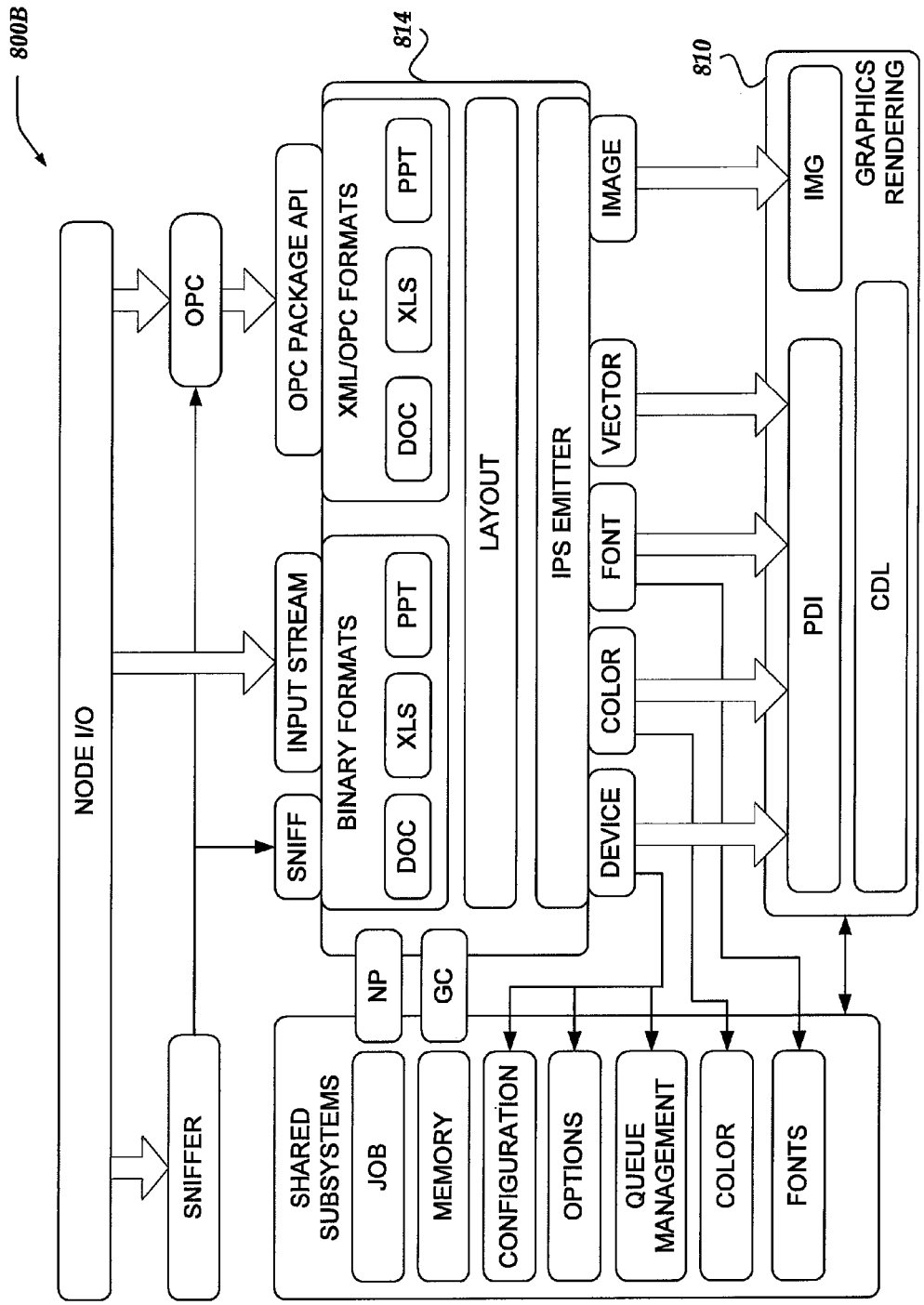

FIGS. 8A and 8B illustrate use case block diagram examples of a system that may be employed to print a document. System 800A of FIG. 8A may include node input/output (I/O) 802, sniffer engine 804, shared subsystems 806, interpreter engines 808, graphics rendering engine 810, and output driver 812. In various embodiments, these engines may also be referred to and/or employed as separate and/or integrated components and/or modules, which may be hardware, software, or a combination thereof.

An input data stream (e.g., a print request that may include at least one page of a file) may be provided to system 800A through node I/O 802. Node I/O 802 may provide the input data stream to each of interpreters 808 and to sniffer engine 804. Interpreter engines 808 may include one or more engines for determining page representations for the received data. These interpreter engines may include, but are not limited to, a PCL 5 engine, a PCL 6 engine, a PostScript engine, a PDF engine, and a document engine. It should be recognized that other types of interpreters that are not illustrated may also be employed. In some embodiments, the incoming data stream may also be provided to an Open Packaging Convention (OPC) component to determine if the data stream is a file in XML format (e.g., .docx, .xlsx, or .pptx). The output of the OPC engine may be provided to an interpreter engine 808, such as, a document engine or an Open XML Paper Specification (XPS) engine. The document engine may receive either the binary version or XML version of the document depending on the native file format of the document provided to the printer.

In some embodiments, node I/O 802 may provide the incoming data to each interpreter engine 808 and sniffer engine 804. Sniffer engine 804 may determine the format of the received file. Based on this determination, sniffer engine 804 may instruct a corresponding interpreter engine 808 to process the incoming data. For example, if the incoming data is for a document in the .doc format, sniffer engine 804 may instruct the document engine to process the incoming data and proceed with the generation of page representations for one or more pages of the document.

As described herein, interpreter engines 808 may determine one or more page representations based on the incoming data. These page representations may be provided to graphics rendering engine 810. Graphics rendering engine 810 may include multiple subcomponents, such as a page decomposing implementer (PDI) component, an imaging (IMG) component, and a common display list (CDL) component. The PDI component may breakdown each page representation into simpler representations at the pixel level (e.g., from a user-based coordinate system to a device-based coordinate system). Similarly, the IMG component may take incoming raster data and make it suitable for rendering. The CDL component may generate the final image representation (e.g., a bitmap) of a corresponding page representation.

Shared subsystems 806 may include various subsystems that may be utilized by one or more interpreter engines 808. Examples of such subsystems may include, but are not limited to, job 814, memory 816, configuration 818, options 820, queue management 822, color 824, and fonts 826. Job 814 may manage and/or maintain a listing of incoming and currently being processed print jobs. Job 814 may manage spooling; secure printing, and/or deferred printing. Memory 816 may be utilized to temporarily store and/or buffer data associated with a print job. Configuration 818 may provide information about the printer, such as available paper sizes, print resolution, or the like. Graphics rendering engine 810 may utilize this information to generate accurate image representations based on constraints and/or configuration of system 800A. Options 820 may include information and/or settings how a document is rendered into the resulting image representations. These options may be general settings or may be specific for the printer, user, and/or job. Queue management 822 may manage multiple pages to be printed for one or more jobs. In some embodiments, if graphics rendering engine 810 is busy, an interpreter engine 808 may store its output (e.g., a page representation) in memory 816 and queue management 822 may manage this stored page representation until graphics rendering engine 810 is available to process a next page representation. Color 824 may be utilized to adjust colors of an image before, during, or after rendering to the page image (i.e., the image representation). Color 824 may be integrated with various other engines/components to enable high fidelity color output to device color space. Fonts 826 may manage device font data. For example, fonts 826 may maintain/provide suitable mappings from Windows fonts to device fonts.

Output driver 812 may be utilized to communicate the image representation to the device's physical printer engine. In some embodiments, output driver 812 may directly pass the generated image representation from graphics rendering engine 810 to the printer engine, in other embodiments, the image representation may be stored on an internal or external (to the printer) storage medium before being retrieved at a later time by one or more other modules for optional further processing an eventually printing on the physical print engine.

System 800B of FIG. 8B may be an embodiment of system 800A. Engine 814 may be an embodiment of document engine of interpreter engines 808 of FIG. 8A. Engine 814 may include sub-engines (or subcomponents) for each separate document formats. Each of these subsystems may breakdown the document into various graphics primitives. Engine 814 may also include a layout component and integrated printer system (IPS) emitter. The layout component may be employed to organize and/or manage the document's overall graphics primitives into a sequence of one or more page representations. The IPS emitter may provide additional document information and make adjustments to the graphics primitives before forwarding them to graphics rendering engine 810. Additional document information may include color calibration data, fonts, device configurations/constraints, or the like. Adjustments may include setting up and invoking color transformations, setting up transformations to scale graphics primitives to device resolution, or the like.

System 800B may also include an IPS nodes and pipes (NP) and a garbage collector (GC). The NP may be utilized to connect and provide basic job information from job API to engine 814. And GC may be utilized to optimize memory and to recover/reduce already allocated memory.

The above specification, examples, and data provide a complete description of the manufacture and use of the composition of the invention. Since many embodiments can be made without departing from the spirit and scope of the invention, the invention resides in the claims hereinafter appended.

What is claimed is:

1. A method for employing a printer to print a document, comprising:
   providing a print request and the document to the printer in a native, non-page-description-language, file format that is editable by a document-processing application;
   employing the print request to determine one or more pages of the document to be printed, wherein the print request includes information identifying the one or more pages;
   determining a page representation for each of the identified one or more pages of the document from the native file format independent of a page description language, wherein each page representation includes a plurality of graphics primitives that are directly supported by the printer;
   determining an image representation for each page representation based on the plurality of graphics primitives included with each corresponding page representation;

determining separate subsets of the plurality of graphics primitives that correspond to separate bands of the one or more pages;

rendering at least a portion of the one or more pages based on the separate subsets of graphics primitives;

decompressing, at the printer, at least a portion of the document that corresponds to the one or more pages prior to determining each page representation; and printing the one or more pages of the document based on the determined image representations.

2. The method of claim 1, wherein determining the image representation for each page representation, includes:

determining pixel accurate representations of each of the plurality of graphics primitives for each page representation; and rasterizing the pixel accurate representations into a bitmap for each page representation.

3. The method of claim 1, wherein the native file format is at least one of a word processing format, a spreadsheet format, or a presentation format.

4. The method of claim 1, further comprising:

obtaining the one or more pages of the document at the printer straight from a portable storage medium connected to an input interface of the printer.

5. The method of claim 1, further comprising:

receiving the one or more pages of the document from a remote computer as a data stream;

determining the native file format from the data stream; and employing an interpreter engine that corresponds to the determined native file format to determine each page representation.

6. The method of claim 1, further comprising determining the one or more pages of the document based on at least one option associated with a print request provided to the printer.

7. A printer apparatus for printing a document, comprising:

a transceiver device that is operative to receive the document in a native, non-page-description-language, file format that is editable by a document-processing application;

a memory device that is operative to store at least instructions;

a processor device that is operative to execute the instructions to enable actions, comprising:

determining one or more pages of the document to be printed based on a received print request that identifies the one or more pages;

determining a page representation for each of the at least one or more pages of the document from the native file format independent of a page description language, wherein each page representation includes a plurality of graphics primitives that are directly supported by the printer; and determining an image representation for each page representation based on the plurality of graphics primitives included with each corresponding page representation;

determining separate subsets of the plurality of graphics primitives that correspond to separate bands of the one or more pages;

rendering at least a portion of the one or more pages based on the separate subsets of graphics primitives;

decompressing, at the printer, at least a portion of the document that corresponds to the one or more pages prior to determining each page representation; and a printing device that is operative to print the one or more pages of the document based on the determined image representations.

8. The printer apparatus of claim 7, wherein determining the image representation for each page representation, includes:

determining pixel accurate representations of each of the plurality of graphics primitives for each page representation; and rasterizing the pixel accurate representations into a bitmap for each page representation.

9. The printer apparatus of claim 7, wherein the native file format is at least one of a word processing format, a spreadsheet format, or a presentation format.

10. The printer apparatus of claim 7, wherein the processor that executes the instructions enables further actions, comprising:

obtaining the one or more pages of the document at the printer straight from a portable storage medium connected to an input interface of the printer.

11. The printer apparatus of claim 7, wherein the processor that executes the instructions enables further actions, comprising:

receiving the one or more pages of the document from a remote computer as a data stream;

determining the native file format from the data stream; and employing an interpreter engine that corresponds to the determined native file format to determine each page representation.

12. A system for employing a printer to print a document, comprising:

an interface operative to receive a print request and receive the document at the printer in a native, non-page-description-language, file format that is editable by a document-processing application;

an interpreter engine operative to employ the print request to determine a page representation for one or more identified pages of the document from the native file format independent of a page description language, wherein each page representation includes a plurality of graphics primitives that are directly supported by the printer, and wherein the print request identifies the one or more pages of the document to be printed, and wherein the interpreter engine is further operative to determine separate subsets of the plurality of graphics primitives that correspond to separate bands of the one or more paces;

a graphics rendering engine operative to determine an image representation for each page representation based on the plurality of graphics primitives included with each corresponding page representation, wherein the graphics rendering engine is further operative to render at least a portion of the one or more pages based on the separate subsets of graphics primitives; and a print engine operative to print the one or more pages of the document based on the determined image representations, wherein the print engine decompresses, at the printer, at least a portion of the document that corresponds to the one or more pages prior to determining each page representation.

13. The system of claim 12, wherein determining the image representation for each page representation, includes:

determining pixel accurate representations of each of the plurality of graphics primitives for each page representation; and rasterizing the pixel accurate representations into a bitmap for each page representation.

14. The system of claim 12, wherein the native file format is at least one of a word processing format, a spreadsheet format, or a presentation format.

15. The system of claim 12, wherein the interface is further operative to obtain the one or more pages of the document at the printer straight from a portable storage medium connected to an input interface of the printer.

16. The system of claim 12, further comprising:
   wherein the interface is further operative to receive the one or more pages of the document from a remote computer as a data stream and determine the native file format from the data stream; and
   wherein the interpreter engine is determined from a plurality of interpreter engines, which corresponds to the determined native file format to determine each page representation.

\* \* \* \* \*